(No Model.)

J. WEIGEL & J. BARCLAY.
ROPE CLAMP.

No. 325,136. Patented Aug. 25, 1885.

Witnesses.
W. R. Edelin
Robt. H. Porter

Inventors.
Joel Weigel.
James Barclay.
Per Halleck & Halleck
Att's

United States Patent Office.

JOEL WEIGEL AND JAMES BARCLAY, OF ERIE, PENNSYLVANIA.

ROPE-CLAMP.

SPECIFICATION forming part of Letters Patent No. 325,136, dated August 25, 1885.

Application filed May 21, 1885. (No model.)

*To all whom it may concern:*

Be it known that we, JOEL WEIGEL and JAMES BARCLAY, citizens, respectively, of the United States and the Dominion of Canada, residing at Erie, in the county of Erie and State of Pennsylvania, have invented certain new and useful Improvements in Rope Clamps; and we do hereby declare the following to be a full, clear, and exact description of the invention, such as will enable others skilled in the art to which it appertains to make and use the same.

This invention consists in certain new and useful improvements in the construction of rope clamps.

The invention is illustrated in the accompanying drawings as applied to various devices which are to be attached to ropes or cables, such as a hook, a sheave, and a splice for connecting the ends of two ropes or cables. It may be applied to a large variety of objects, and it may be of such a size as to be used on large ropes or cables or on small ones. It is particularly intended for use on wire ropes or cables, but it can be used as well on common hemp or fibrous ropes or on single strands of wire.

Figure 1:
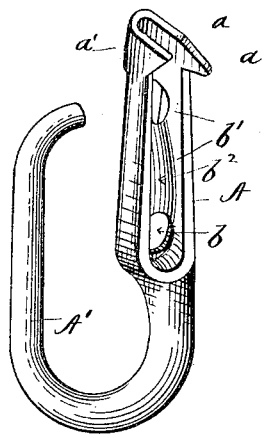
Figure 2:
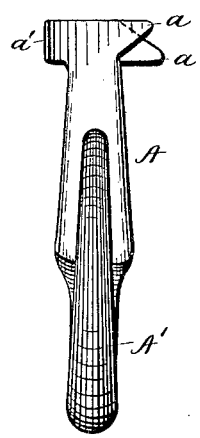
Figure 3:
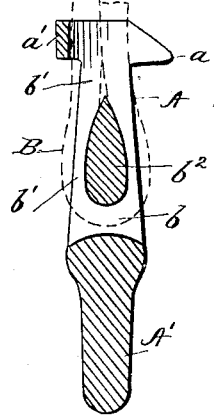
Figure 4:
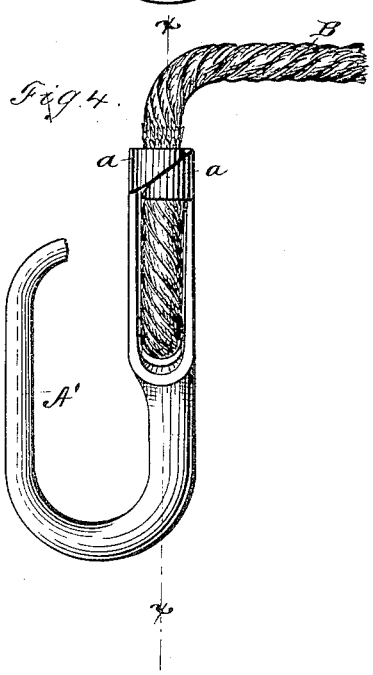
Figure 5:
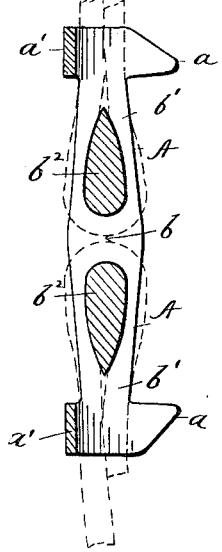
Figure 6:
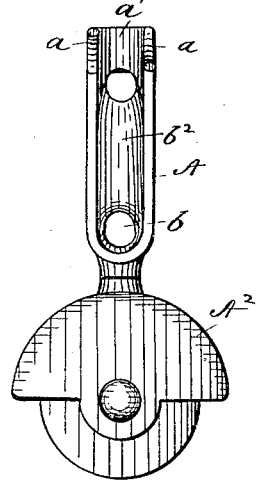

Figure 1 is a perspective view showing our clamp on a hook. Fig. 2 is a side elevation of the same. Fig. 3 is a longitudinal section on the line $x\ x$ in Fig. 4. Fig. 4 shows the hook attached to a rope. Fig. 5 is a like view to Fig. 3, but shows the device made so as to be used to splice or connect two pieces of rope or cable. Fig. 6 is a front elevation, but shows the device connected with a sheave or pulley.

The device is made of malleable cast-iron; but it could be made of cast-steel or of other metal. It is made whole with the hook or other object with which it is connected; but it could be made separate from it and otherwise connected, if so desired.

The clamping device here shown in the drawings consists of a body, A, with grooves $b'$ on opposite sides, which meet in an opening, $b$, through the body and at the end, where it is provided with a band, $a\ a\ a'$, which is left open on one side until the rope is in place, and then its open ends $a\ a$ are clinched or closed upon the rope. The open ends $a\ a$ we prefer to form so that when clinched down onto the rope the seam between them will be diagonal across the band; but this is not essential.

The position of the rope in the clamp is clearly shown in the drawings. It is simply looped around the web $b^2$, and lies within the grooves $b'$, and the band $a\ a\ a'$ embraces the rope at the upper end of the loop and firmly holds both the rope and its ends together so they cannot slip.

The device shown in Fig. 5 is simply a double clamp, and will be used to splice or connect two ropes together.

What we claim as new is—

1. As a new article of manufacture, a rope-clamp consisting of a body, A, having side grooves $b'$, which meet and form the opening $b$ and the web $b^2$, and an open-sided band, $a\ a\ a'$, which can be closed upon a rope lying in the grooves $b'$ and looped around the web $b^2$, as set forth, said parts being formed of one piece of metal.

2. The combination, substantially as set forth, of a rope-clamp consisting of a body, A, having side grooves $b'$, which meet and form the opening $b$ and web $b^2$, and an open-sided band, $a\ a\ a'$, which can be closed upon a rope lying in the grooves $b'$ and looped around the web $b^2$, as set forth, and a hook or other object to be attached to said rope formed integral with said rope-clamp.

In testimony whereof we affix our signatures in presence of two witnesses.

JOEL WEIGEL.
JAMES BARCLAY.

Witnesses:
JNO. K. HALLOCK,
WM. P. HAYES.